United States Patent
Kwok

(12) 
(10) Patent No.: US 6,481,764 B1
(45) Date of Patent: Nov. 19, 2002

(54) PIPE COUPLING METHOD AND APPARATUS

(75) Inventor: Adam Kwok, Newcastle (AU)

(73) Assignee: Dixlod Pty. Ltd., Newcastle (AU)

( * ) Notice: Subject to any disclaimer, the term of this patent is extended or adjusted under 35 U.S.C. 154(b) by 0 days.

(21) Appl. No.: 09/463,539

(22) PCT Filed: Jul. 28, 1998

(86) PCT No.: PCT/AU98/00601

§ 371 (c)(1),
(2), (4) Date: Apr. 3, 2000

(87) PCT Pub. No.: WO99/06748

PCT Pub. Date: Feb. 11, 1999

(30) Foreign Application Priority Data

Jul. 28, 1997 (AU) .............................................. PO 8254

(51) Int. Cl.[7] ................................................ F16L 13/14
(52) U.S. Cl. ........................... 285/382; 29/508; 29/516; 285/382.1; 285/382.2
(58) Field of Search ............................... 285/382.2, 382, 285/382.1; 29/508, 516

(56) References Cited

U.S. PATENT DOCUMENTS

| 2,192,914 | A | * | 3/1940 | Ice ............................. 29/508 |
| 2,202,125 | A | * | 5/1940 | Temple, Jr. ................... 72/415 |
| 3,244,441 | A | * | 4/1966 | Caudle ........................ 285/382 |
| 4,330,924 | A | * | 5/1982 | Kushner .................. 285/382.2 |
| 4,371,199 | A | * | 2/1983 | Kushner et al. ......... 285/382.2 |
| 4,528,740 | A | * | 7/1985 | Sassak .................... 285/382.2 |
| 5,484,174 | A | | 1/1996 | Gotoh et al. |

FOREIGN PATENT DOCUMENTS

| CH | 648643 A | 3/1985 |
| DE | 4325349 A | 2/1995 |
| DE | 19507688 A | 5/1996 |
| DE | 19700583 A | 7/1997 |
| DE | 19609257 A | 9/1997 |
| FR | 2398955 A | 2/1979 |
| WO | WO 90/00697 A | 1/1990 |

* cited by examiner

*Primary Examiner*—Lynne H. Browne
*Assistant Examiner*—Aaron Dunwoody
(74) *Attorney, Agent, or Firm*—Wood, Philips, Katz, Clark & Mortimer

(57) ABSTRACT

A method of connecting two malleable pipes comprising locating the pipes, one inside a portion of the other with O-rings between the pipes, and applying a crimping tool to inwardly deform the pipes and thereby cause the O-rings to deform and establish a fluid tight seal between the pipes.

3 Claims, 5 Drawing Sheets

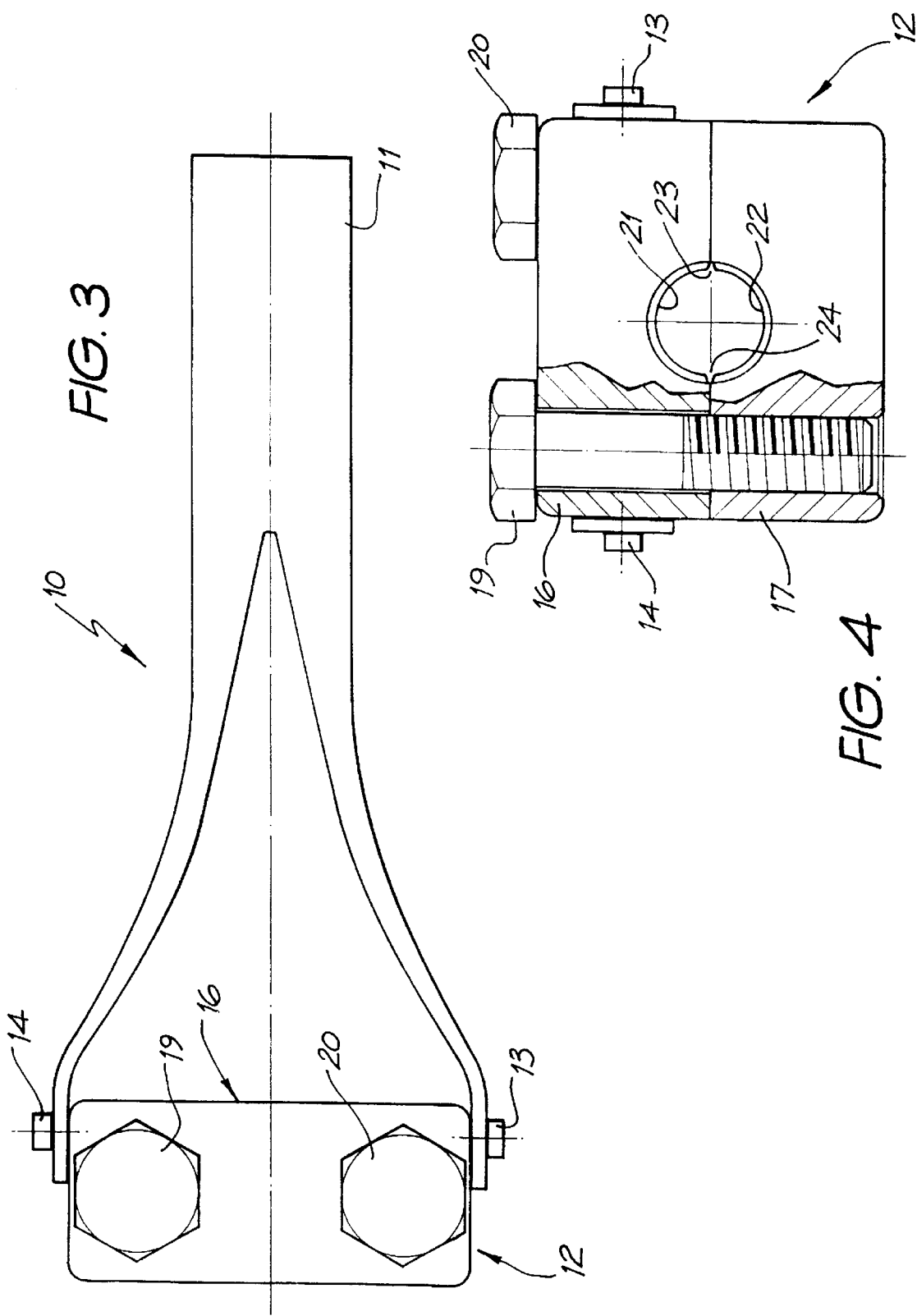

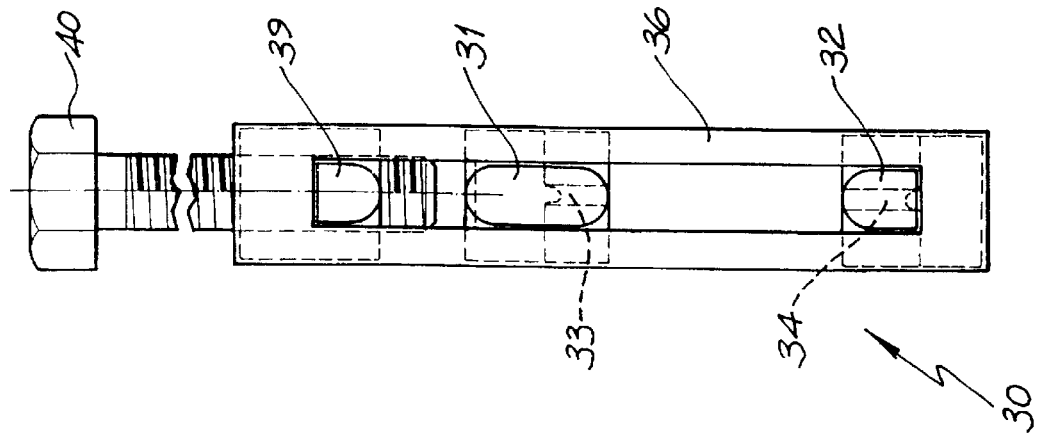
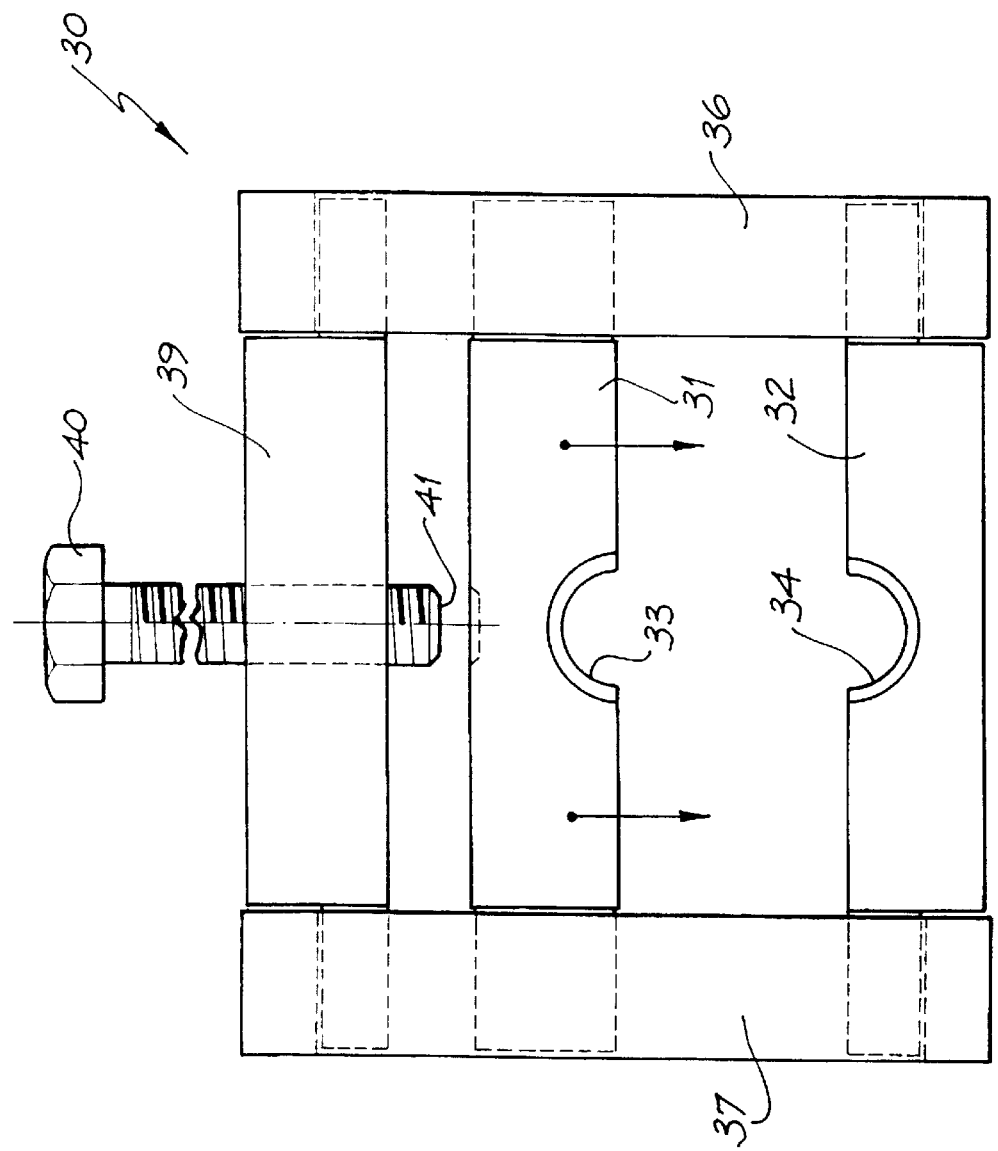

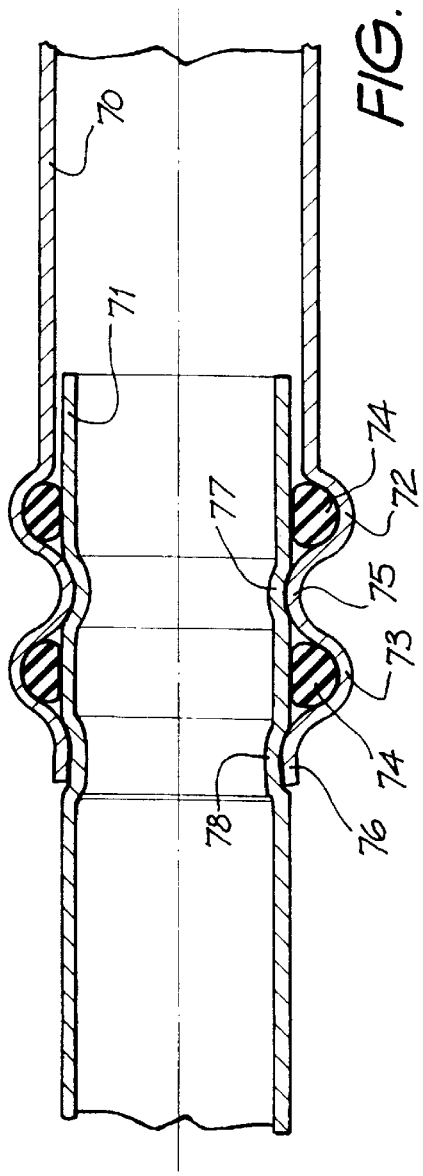
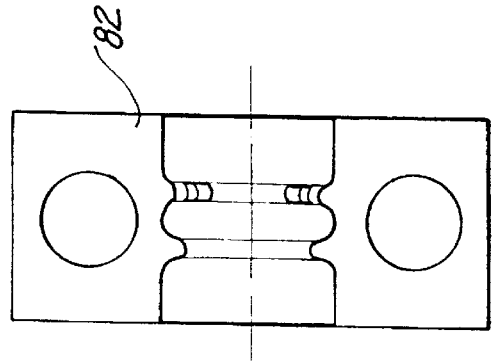
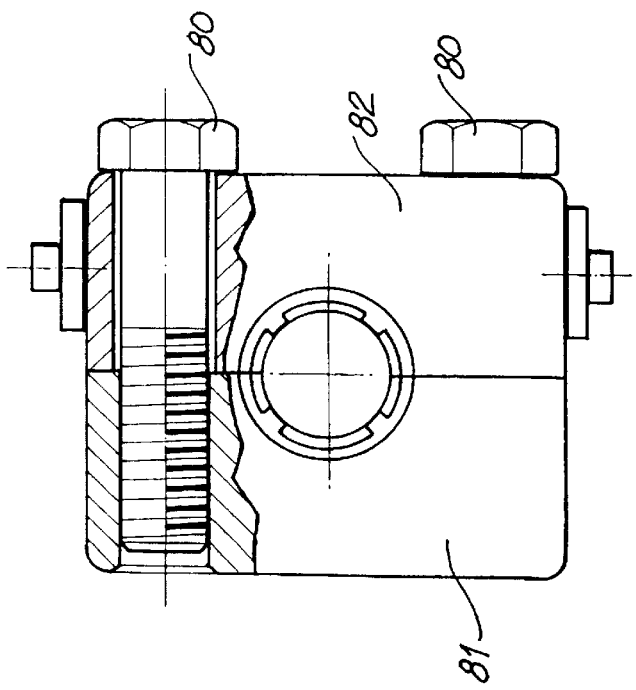
FIG. 7
FIG. 9
FIG. 8

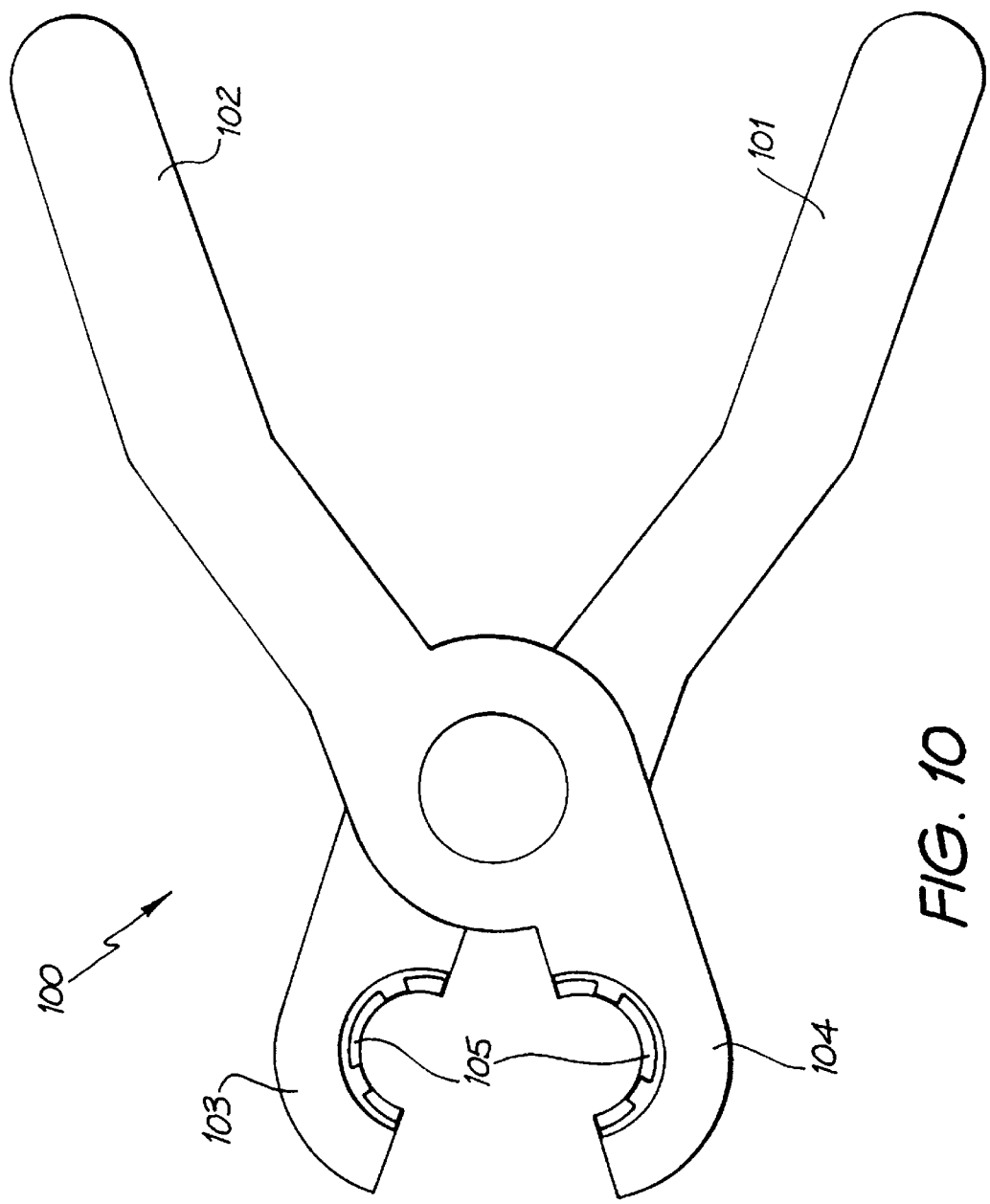

PIPE COUPLING METHOD AND APPARATUS

FIELD OF THE INVENTION

The present invention relates to the coupling of pipes which are malleable and deformable such as pipes made of stainless steel, copper and other metals.

BACKGROUND OF THE INVENTION

Many types of pipe coupling systems are well known. However, when these systems are utilized to couple pipes made of materials of significant strength, such as stainless steel, the system or apparatuses utilized to couple two pipes together often fail with consequential failure to properly couple and seal two pipes together. Further, apparatuses associated with coupling the pipes together are often complex and there is a general need for a simple pipe coupling system, especially when utilized on stainless steel pipes or the like.

It is believed that proposals for crimped connectors for fluid type connections have not achieved significant acceptance due to lack of reliable and convenient characteristics which will meet quite specific requirements of regulatory authorities.

One example of a known crimped system is that of U.S. Pat. No. 4,257,155 (J J Hunter). This system relies on one pipe having a bell end and receiving in telescopic engagement the end of another pipe. A crimping tool is annularly engaged around the bell end portion to deform it inwardly and also to deform inwardly the underlying other pipe. Fluid tightness thus inherently depends upon such a metal to metal crimped joint and to be reliable may require complex flexible liners which may be difficult to engage and may be ineffective in use.

Another prior published system is that described in Australian patent application AU-A-13075/92 (Reid and Davies). This proposal has a rigid interior grooved connection member including a first deeper groove portion being adapted to contain an O-ring and a second adjacent portion being adapted to have crimped into it a portion of a telescopically engaged malleable pipe. The connection member having a relatively thick wall is received internally within the malleable pipe and significantly restricts the flow passage through the pipe.

By contrast to prior proposals the present invention proposes an arrangement which is believed to be practicable and effective at providing reliable fluid tight joints.

SUMMARY OF THE INVENTION

According to a first aspect of the present invention there is provided a method of connecting two malleable pipes comprising locating an end portion of one pipe inside the end portion of the other pipe with an O-ring located between the end portions, and using a crimping tool to apply inwardly directed crimping forces in a. radially inward direction around the O-ring and in a manner to cause radially inward deformation of both pipe portions immediately adjacent each side of the O-ring whereby the O-ring is deformed and partially flattened to establish a fluid tight seal between the pipes.

Most preferably, the deformable O-ring is one of two axially spaced O-rings and application of the crimping means involves a first crimping operation being applied across a first of the O-rings so as to form a crimp between the pipes on both sides of the first O-ring, and a second crimping operation being applied across a second of the 0rings so as to form a crimp between the pipes on both sides of the second O-ring.

The invention is generally applicable to pipes of malleable material; an especially important application of the invention is to stainless steel pipes which have many advantages in terms of inertness and capable of being worked. For example, the invention has been tested with stainless steel pipes having relatively small wall thicknesses, i.e. generally less than 1 mm and typically 0.7 mm and grade 304 or 316 stainless has been successfully trialed.

Although the crimping force can be applied uniformly around the periphery of the pipes, some discontinuity in the applied crimping force or the crimping means itself can be advantageous in some embodiments and in particular those where resistance to relative rotational motion of the two pipes about their axes is desired.

The crimping force is preferably provided by a crimping die which could be of the form for hand tool having two die carriers.

Another aspect of the invention consists in a kit or combination of parts comprising first and second pipes adapted for interconnection in accordance with the first aspect of the invention and flexible sealing means in the form of O-rings for cooperation therewith.

Another aspect of the invention consists in pipe joints made utilising any form of the invention as described above.

BRIEF DESCRIPTION OF THE DRAWINGS

For illustrative purposes only, embodiments will now be described by reference to the accompanying drawings:

FIG. 3 is a plan view of the tool of FIG. 2;

FIG. 4 is a front view, partly in section, of the tool;

FIG. 5 illustrates a front view of an alternative tool;

FIG. 6 illustrates a side view of the tool of FIG. 5;

FIG. 7 is a cross-sectional view through a second and preferred embodiment of the invention showing a coupling between two pipes with only one of the two required crimps performed on the coupling;

FIG. 8 is a partially cross-sectioned front elevation of a crimping tool particularly adapted for use in the embodiment of FIG. 7;

FIG. 9 is an end elevation of the tool of FIG. 8; and

FIG. 10 is a schematic front elevation of an alternative crimping tool adapted to be hand operated.

Referring now to FIG. 1, there is illustrated, in section, two stainless steel pipe ends 1 and 2. Between the stainless steel pipe ends 1 and 2, is placed a cylindrical rubber sheet 3 or other suitable sealant, which is designed to act as an O-ring device and seal the connection between the two pipes 1 and 2. The apparatus of the preferred embodiment is designed to produce a series of circumferential crimps 4, 4a around the stainless pipes 1 and 2 so as to pinch the rubber sheet 3 between the two pipes and to strongly couple together the two pipes 1 and 2.

Referring now to FIGS. 2–4, there are illustrated plan views, partly in section, of one form of the apparatus of the preferred embodiment 10, FIG. 2 illustrating a side plan view, FIG. 3 illustrating a top plan view, and FIG. 4 illustrating a front plan view. The apparatus 10 includes a handle 11 which has a semi-circular annulus cross section and is designed to fit along, in the axial direction, a suitably sized portion of pipe. The handle 11 is pivotally hinged to a body 12 by means of hinges 13, 14. The body 12 can be separated into two portions 16, 17 which are separable and designed to be placed around the pipe to be crimped. Once the two portions 16, 17 are placed around the circumference of the pipe to be crimped, bolt screws 19, 20 are inserted through a corresponding cavity in each of the portions 16, 17. The bolts 19, 20 have a thread which is reciprocated by a reciprocating thread within body portion 17. Hence, the body 12 can be placed around a pipe, with the bolt screws 19, 20 utilized to initially provide a tight fit for the two portions 16, 17 around the pipe.

Figure 1:
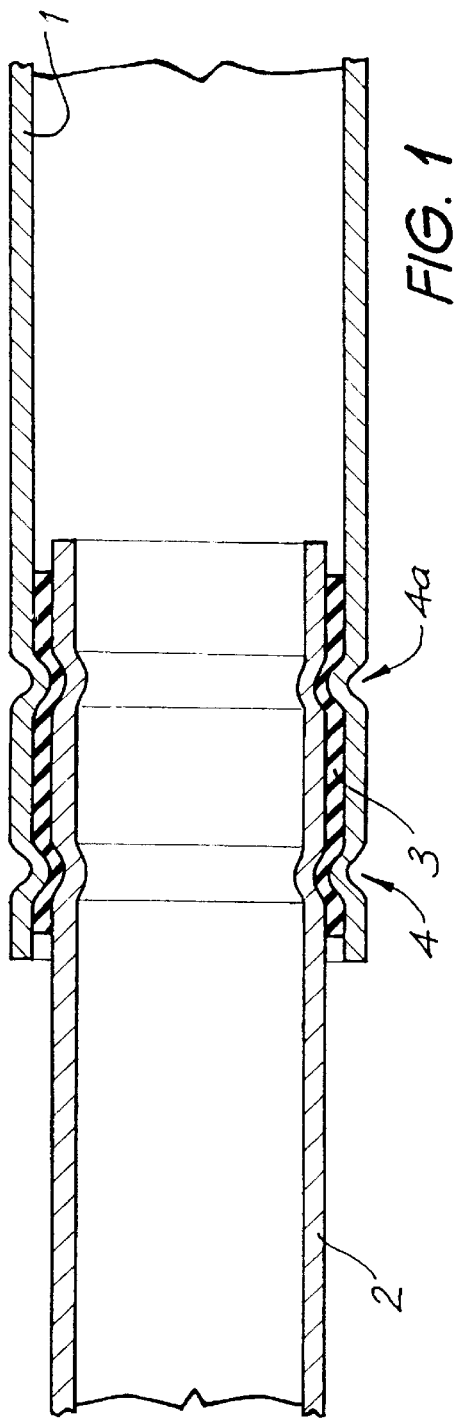
FIG. 1 is a cross section view of two pipes crimped together in accordance with one embodiment.
Figure 2:
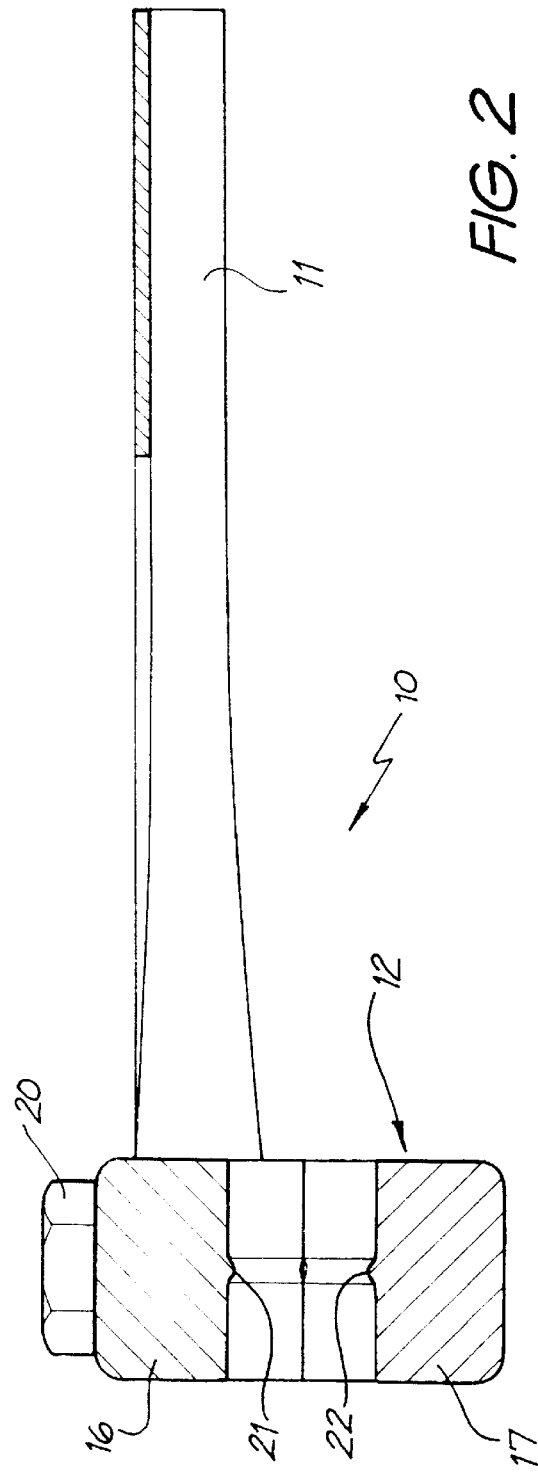
FIG. 2 is a side view partly in section of one embodiment of a tool for use with the embodiment of FIG. 1.

One hand of an operator is then utilised to clamp handle 11 around a portion of the pipe while a spanner is utilised by the other hand to tighten bolt screws 19, 20 so as to draw the two portions 16, 17 closer together, thereby increasing the force with which protuberances 21, 22 are forced against the section of the pipe 1. The protuberances 21, 22 thereby are forced to crimp the pipe 1 (FIG. 1) causing the pipe to pinch the rubber sheet 3 and second pipe 2 together, with further tightening of bolt screws 19, 20.

Preferably, the protuberances 21, 22 do not extend fully around the circumference of the pipe and there is provided a small space 23, 24 for the pipe to bulge at the side. Alternatively, the space between the two body portions 16, 17 as they are brought together can be utilised to "pinch" the sides of two pipes. The resulting crimp therefore is not totally symmetrical around the pipe and has two side bulges. The non-symmetrical crimping is significant in that the resulting coupling resists rotational movement of one pipe end 2 relative to the other pipe end 1.

Once the two bolt screws 19, 20 have been tightened to the requisite extent to bring two portions 16, 17 together, the bolts are unscrewed and the portions 16, 17 removed, the result being a crimp coupling 4 between two pipes. The apparatus can then be utilised to impart a second crimp coupling 4a between the two pipes in the same manner.

Referring now to FIGS. 5 and 6, there is illustrated an alternative embodiment of an apparatus suitable for crimping pipes together. FIG. 5 illustrates a front plan view of the alternative apparatus and FIG. 6 illustrates a side plan view of an alternative apparatus. The alternative embodiment 30 includes two block portions 31, 32 each having a corresponding blade portion 33, 34. Each of the block portions 31, 32 is placed within a slotted side bracket 36, 37. A further block portion 39 is also provided and contains an aperture and thread designed to receive a suitably sized screw bolt 40. The screw bolt 40 can be of varying length. In use, the screw bolt 40 is tightened and the end 41 engages the block portion 31 forcing it towards the block portion 32. Before tightening, the pipes are placed resting on blade portion 34, with the subsequent tightening of bolt 40 resulting in blade portions 33, 34 being forced against a pipe and thereby producing a crimp coupling as hereinbefore described.

Referring now to FIG. 7 an outer pipe 70 is to be coupled telescopically to an inner pipe 71 which has a diameter so as to fit within the outer pipe 70 with a pair of axially spaced O-rings located therebetween. FIG. 7 shows schematically the crimped coupling. After sliding assembly, a crimping tool is applied. Although a single crimping tool to form both crimps could be utilised, equally each crimp can be separately formed.

The outer tube 70 is inwardly crimped in two stages with the crimping tool during each stage locating across one of the pair of O-rings 74 thereby causing crimping at corresponding annular zones 75,77 and 76,78. This deformation causes pressure to be applied to the O-rings which typically deform and flatten being of low compressible material.

FIG. 8 illustrates an option of a die arrangement which is not continuous around the tubes thereby providing greater deformation in some points than others. This substantially prevents relative rotation of the tubes and this can be advantageous in some applications. The embodiments of FIGS. 8 and 9 rely on two screws 80 which pull together the die portions 81 and 82.

FIG. 10 shows an alternative tool 100 having a pair of arms 101 and 102 which is squeezed together manually. The opposite ends of the tool comprises crimping arms 103 and 104 carrying crimping dies 105.

The claims defining the invention are as follows:

1. A method of connecting two malleable pipes comprising locating an end portion of one pipe inside the end portion of the other pipe with an O-ring located between the end portions, and using a crimping tool to apply inwardly directed crimping forces in a radially inward direction around the O-ring and in a manner to cause radially inward deformation of both pipe portions immediately adjacent each side of the O-ring whereby the O-rig is deformed and partially flattened to establish a fluid tight seal between the pipes, wherein the O-ring is one of two axially spaced O-ring and application of the crimping tool comprises a first crimping operation across a first of the O-rings so as to form a crimp between the pipes on both sides of the first O-ring, and a second crimping operation across a second of the O-rings so as to form a crimp between the pipes on both sides of the second O-ring.

2. A method as claimed in claim 1 wherein the application of the crimping tool has a discontinuity in the applied crimping force so as to provide resistance to relative rotational motion of the two pipes about their axes.

3. A method as claimed in claim 1, and further including mounting crimping dies in the crimping tool prior to effecting use of the tool to crimp the pipes.

* * * * *